US007962611B2

(12) United States Patent
Hurley et al.

(10) Patent No.: US 7,962,611 B2
(45) Date of Patent: Jun. 14, 2011

(54) METHODS, SYSTEMS AND COMPUTER PROGRAM PRODUCTS FOR DETECTING FLOW-LEVEL NETWORK TRAFFIC ANOMALIES VIA ABSTRACTION LEVELS

(75) Inventors: Paul T. Hurley, Zurich (CH); Andreas Kind, Kilchberg (CH); Marc Ph. Stoecklin, Basel (CH)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 12/056,583

(22) Filed: Mar. 27, 2008

(65) Prior Publication Data

US 2009/0245109 A1 Oct. 1, 2009

(51) Int. Cl.
*G06F 15/173* (2006.01)
(52) U.S. Cl. ......... 709/224; 709/223; 370/229; 370/235
(58) Field of Classification Search .......... 709/223–224; 370/229–236
See application file for complete search history.

(56) References Cited

U.S. PATENT DOCUMENTS

| 7,594,014 | B2 * | 9/2009 | Nakamura | 709/224 |
|---|---|---|---|---|
| 7,599,293 | B1 * | 10/2009 | Bain et al. | 370/235 |
| 7,860,965 | B1 * | 12/2010 | Bain et al. | 709/224 |
| 7,865,582 | B2 * | 1/2011 | Santos et al. | 709/223 |
| 2007/0211635 | A1 * | 9/2007 | Hao et al. | 370/235 |
| 2009/0265784 | A1 * | 10/2009 | Waizumi et al. | 726/23 |
| 2010/0014420 | A1 * | 1/2010 | Wang et al. | 370/229 |
| 2010/0138919 | A1 * | 6/2010 | Peng et al. | 726/22 |

OTHER PUBLICATIONS

Mining Anomalies Using Traffic Feature Distributions, [online]; [retrieved on Mar. 26, 2008]; retrieved from the Internet http://www.sigcomm.org/sigcomm2005/paper-LakCro.pdf.
Detectability of Traffic Anomalies in Two Adjacent Networks, [online]; [retrieved on Mar. 26, 2008]; retrieved from the Internet http://www.cs.princeton.edu/~jrex/papera/pam07.pdfon.
Detecting Anomalies in Network Traffic Using Maximum Entropy Estimation, [online]; [retrieved on Mar. 26, 2008]; retrieved from the Internet http://www.imconf.net/imc-2005/papers/im05efiles/gu/gu.pdf.
Sourcefire Vulnerability Research Team (VRT), [online]; [retrieved on Mar. 26, 2008]; retrieved from the Internet http://www.snort.org.
Chapter 2 Writing SNORT Rules How To Write SNORT Rules And Keep Your Sanity, [online]; [retrieved on Mar. 26, 2008]; retrieved from the Internet http://www.snort.org/docs/writing_rules/chap2.html.
Bro Intrusion Detection System, [online]; [retrieved on Mar. 26, 2008]; retrieved from the Internet http://www.bro-ids.org.

(Continued)

*Primary Examiner* — Bharat N Barot
(74) *Attorney, Agent, or Firm* — Cantor Colburn LLP; Stephen Kaufman

(57) ABSTRACT

Methods, systems and computer program products for detecting flow-level network traffic anomalies via abstraction levels. An exemplary embodiment includes a method for detecting flow-level network traffic anomalies in a computer network, the method including obtaining current distributions of flow level traffic features within the computer network, computing distances of the current distributions' components from a distributions model, comparing the distances of the current distributions to distance baselines from the distributions model, determining if the distances are above a pre-determined thresholds and in response to one or more of the distances being above the pre-determined thresholds in one or more distributions, identifying the current condition to be abnormal and providing indications to its nature.

20 Claims, 8 Drawing Sheets

OTHER PUBLICATIONS

OSSEC, [online]; [retrieved on Mar. 26, 2008]; retrieved from the Internet http://www.ossec.net.

OSSEC, [online]; [retrieved on Mar. 26, 2008]; retrieved from the Internet http://en.wikipedia.org/wiki/OSSEC.

Tripwire, [online]; [retrieved on Mar. 26, 2008]; retrieved from the Internet http://www.tripwore.com.

SNORT-Lightweight Intrusion Detection for Networks, [online]; [retrieved on Mar. 26, 2008]; retrieved from the Internet http://www.usenix.org/events/lisa99/full_papers/roesch/roesch.pdf.

Detection and Characterization of Port Scan Attacks, [online]; [retrieved on Mar. 26, 2008]; retrieved from the Internet http://www.cs.icsd.edu/users/clbailey/PortScans.pdf.

* cited by examiner

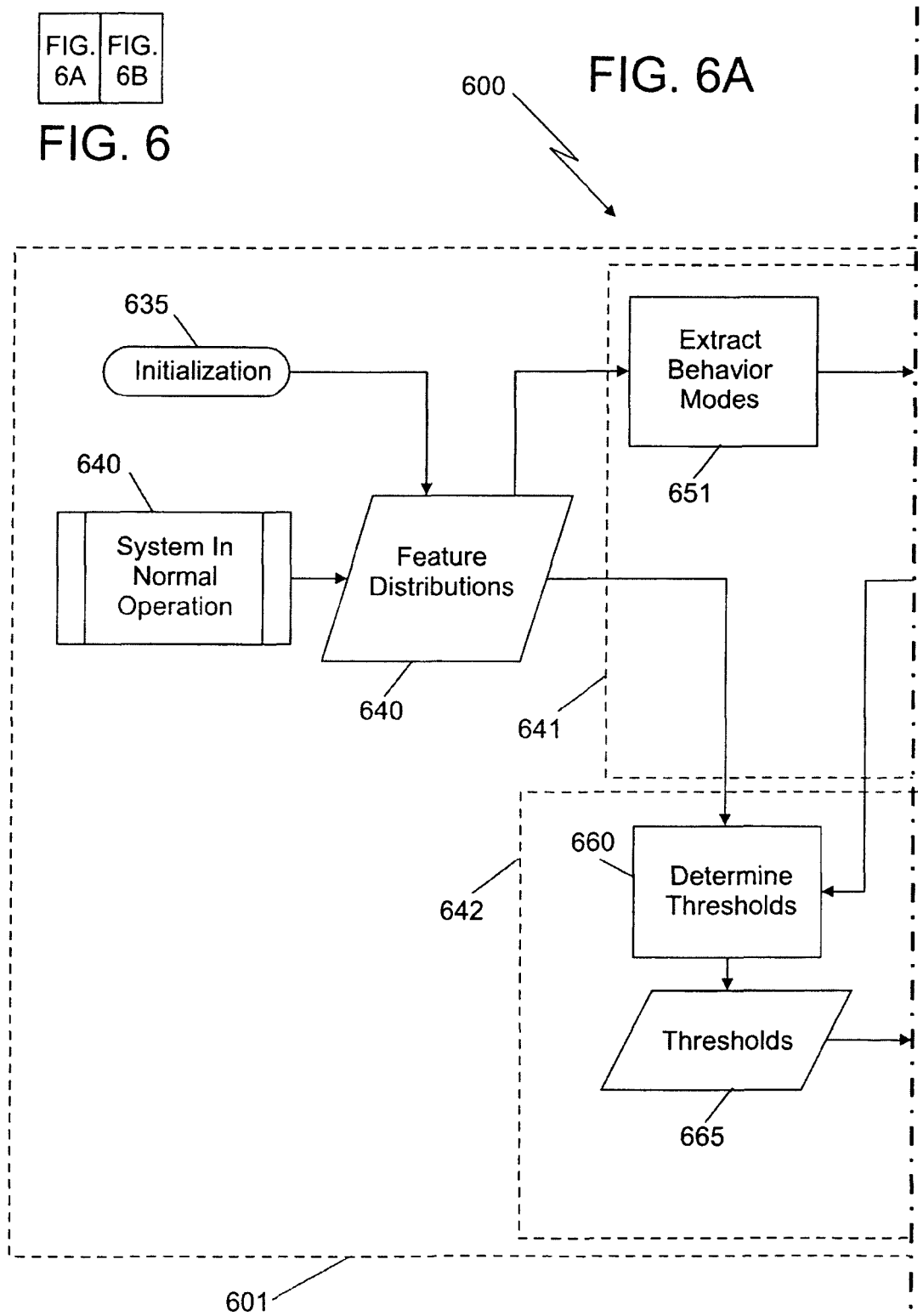

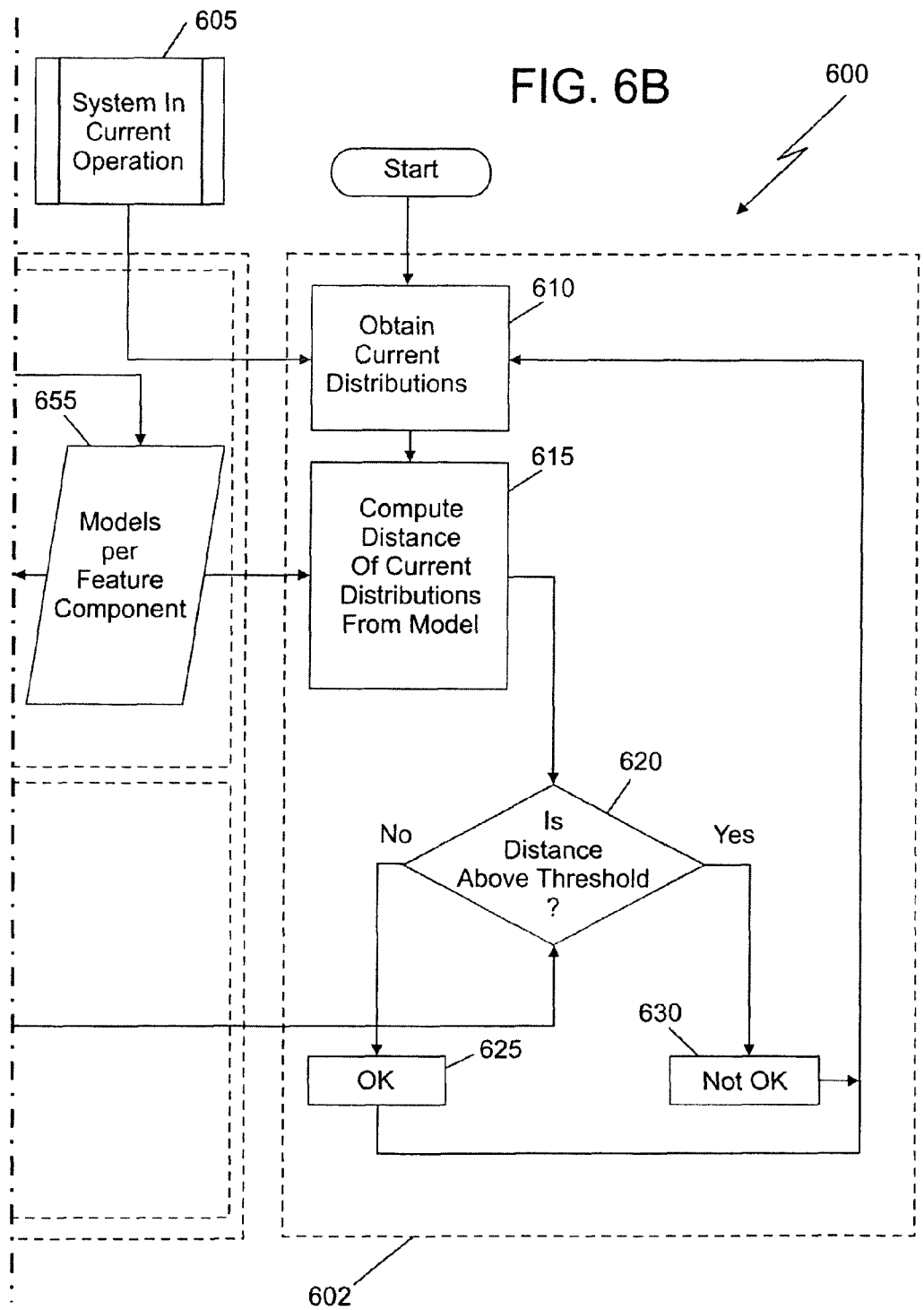

METHODS, SYSTEMS AND COMPUTER PROGRAM PRODUCTS FOR DETECTING FLOW-LEVEL NETWORK TRAFFIC ANOMALIES VIA ABSTRACTION LEVELS

BACKGROUND OF THE INVENTION

This invention relates generally to network traffic monitoring, and more particularly to providing detection of flow-level network traffic anomalies via abstraction levels.

Safeguarding the availability and reliability of resources in computer networks poses a major challenge for network administrators. Conditions detrimental to a network's performance need to be detected in a timely and accurate manner. Such undesirable conditions are usually termed network anomalies and include attacks and abuse of resources, significant changes of user behavior, and failures of mission-critical servers and devices. Many of these events cannot be described by means of explicit signatures or differ slightly from known anomalies patterns. Signature-based intrusion detection systems are thus likely to fail to detect them. Behavior-based anomaly detection techniques are a complementary approach to address these shortcomings. Their inherent assumption relies on the fact that anomalies are rarely observed in traffic and that if an abnormal event is present, certain characteristics of the network behavior change. An anomaly-based detection system establishes baseline profiles of the normal behavior of a network and flags perturbations thereof as abnormal.

In general, every traffic event leaves traces in distributions of flow level traffic features, such as packet header fields (e.g., IP addresses and service port numbers, TCP flags, etc.) and flow properties (e.g., the number of transmitted packets and octets, flow duration, etc.). Each feature distribution includes of a set of associated components, (i.e., the actual values the feature can take). For example, port numbers 80/http and 22/ssh are components of the "service port" feature. Each component in a feature distribution is subject to variation and may exhibit multiple normal behavior modes (e.g., depending on time of day, application states, user behavior). Many existing techniques apply a pre-processing step to the distributions (e.g., take its sample entropy) to obtain an estimate of its properties. However, precious information may be lost at this early stage before being presented to detection algorithms. Each component in a feature distribution is subject to variation and may exhibit multiple normal behavior modes (e.g., depending on time of day). Early summarization of distributions is therefore likely to miss such individual behavior patterns.

BRIEF SUMMARY OF THE INVENTION

An exemplary embodiment includes a method for detecting flow-level network traffic anomalies in a computer system, the method including obtaining current distributions of flow level traffic features within the computer system, computing a distance of the current distributions from a distributions model, comparing the distance of the current distributions to a distance baseline from the distributions model, determining if the distance is above a pre-determined threshold, in response to the distance being above the pre-determined threshold, identifying the distance to be an anomaly and in response to the distance being below the pre-determined threshold, identifying the distance to be within normal operation of the computer system.

Another exemplary embodiment includes a computer system for detecting flow-level network traffic anomalies, the system including a processor, a first computation layer associated with the processor, the first computation layer configured to detect anomalies that affect single components of a traffic feature associated with the computer system and a second computation layer associated with the processor, the second computation layer configured to detect anomalies that affect a plurality of components in the traffic feature, whereby the anomalies that affect the plurality of components in the traffic feature are detectable as an aggregate effect.

A further exemplary embodiment includes a computer program product for detecting flow-level network traffic anomalies, the computer program product including a tangible storage medium readable by a processing circuit and storing instructions for execution by the processing circuit for performing a method including obtaining current distributions of flow level traffic features within the computer system, computing a distance of the current distributions from a distributions model, comparing the distance of the current distributions to a distance baseline from the distributions model, determining if the distance is above a pre-determined threshold, in response to the distance being above the pre-determined threshold, identifying the distance to be an anomaly and in response to the distance being below the pre-determined threshold, identifying the distance to be within normal operation of the computer system.

BRIEF DESCRIPTION OF THE DRAWINGS

Referring now to the drawings wherein like elements are numbered alike in the several FIGURES:

FIG. 6 illustrates a flow chart of a method for detecting flow-level network traffic anomalies on two abstraction levels in accordance with exemplary embodiments.

DETAILED DESCRIPTION OF EXEMPLARY EMBODIMENTS

An exemplary embodiment of the present invention provides methods, systems and computer program products for detecting network flow anomalies including a two-layer abstraction stage. In exemplary embodiments, network flow behavior is modeled in each feature component individually for different traffic features (e.g., IP addresses, service ports, TCP flags, etc.). In exemplary embodiments, one stage correlates model parameters in each component to obtain a minimal distance and the distances are summed then up per component to obtain the anomaly behavior-based detection for each component. In exemplary embodiments, a two-layered distance computation provides a set of anomaly indices to expose aberrant behavior of various natures: a component-wise analysis layer and a feature-wise analysis layer. In exemplary embodiments, the component-wise analysis layer (local) measures how close the flow behavior observed in each component of a feature matches the learned behavior modes. This indicator enables the methods described herein to detect changes that affect individual components, (e.g., a host or service failure or the presence of an abnormally large number of flows with similar properties (e.g. spam relaying, worm outbreaks)). In exemplary embodiments, the feature-wise analysis layer (global) exposes abnormal behavior (e.g., contributing only small deviations in many components) by accumulating the component-wise distances to a single index in each feature. For example, a port scan will add a small change in the observed behavior of the ports scanned. While there is no substantial deviation from the normal behavior measured in each port, its presence is revealed by a large deviation in the global anomaly index of the ports. In exemplary embodiments, the network behavior is measured in terms of the number of flows observed ("flow counts") in each component during consecutive time periods of fixed durations. The learned models of a component represent typical flow counts (i.e., flow counts that are frequently observed and represent normal behavior modes.)

Figure 1:
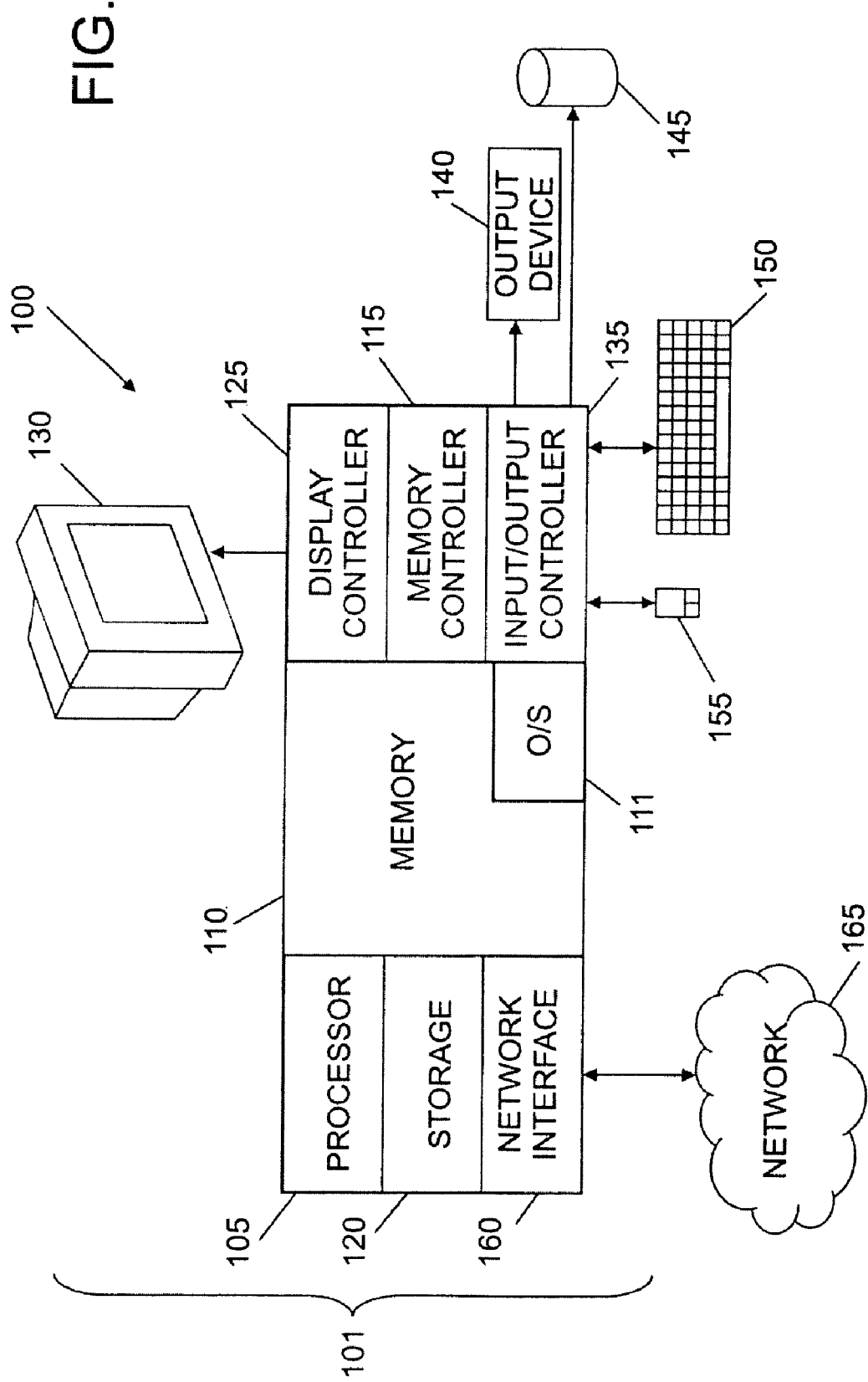
FIG. 1 illustrates an exemplary embodiment of a system for detecting flow-level network traffic anomalies on two abstraction levels.

FIG. 1 illustrates an exemplary embodiment of a system 100 for detecting flow-level network traffic anomalies on two abstraction levels. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory, 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the network traffic anomaly detection methods described herein in accordance with exemplary embodiments and a suitable operating system (OS) 111. The operating system 111 essentially controls the execution of other computer programs, such the network traffic anomaly detection systems and methods described herein, and provides scheduling, input-output control, file and data management, memory management, and communication control and related services.

The network traffic anomaly detection methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the network traffic anomaly detection methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The network traffic anomaly detection methods described herein and the OS III, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The network traffic anomaly detection methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the network traffic anomaly detection methods are implemented in hardware, the network traffic anomaly detection methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, exemplary embodiments include a flow-based technique to perform anomaly detection on two abstraction layers by taking the dynamic nature of individual components of the traffic features considered into account. In exemplary embodiments, the systems and methods described herein do not incorporate prior knowledge of normal and abnormal traffic characteristics and is therefore not bound to detect specific network anomalies. Instead, the systems and methods described herein implement positive learning examples to mine for normal behavior modes and to extract multi-modal model parameters in each component in an unsupervised manner. To compare observed network traffic with the learned modes, a non-linear correlation system finds the best matching model in each component. The resulting component-wise distances enable a twofold detection: (i) a component-wise anomaly index and, by aggregating the distances, (ii) a global index of each traffic feature. This duality enables detection of anomalies that affect isolated (e.g., a failure of a host, DoS attack) as well as multiple components (e.g., network scans, worm outbreaks). The modeling technique supports on-line detection and incorporation of administrator feedback to gradually reduce the false positive rate. To classify observed anomalies on demand, an in-depth analysis of suspicious events is enabled by providing deviation vectors of the traffic features for decision support.

Figure 2:
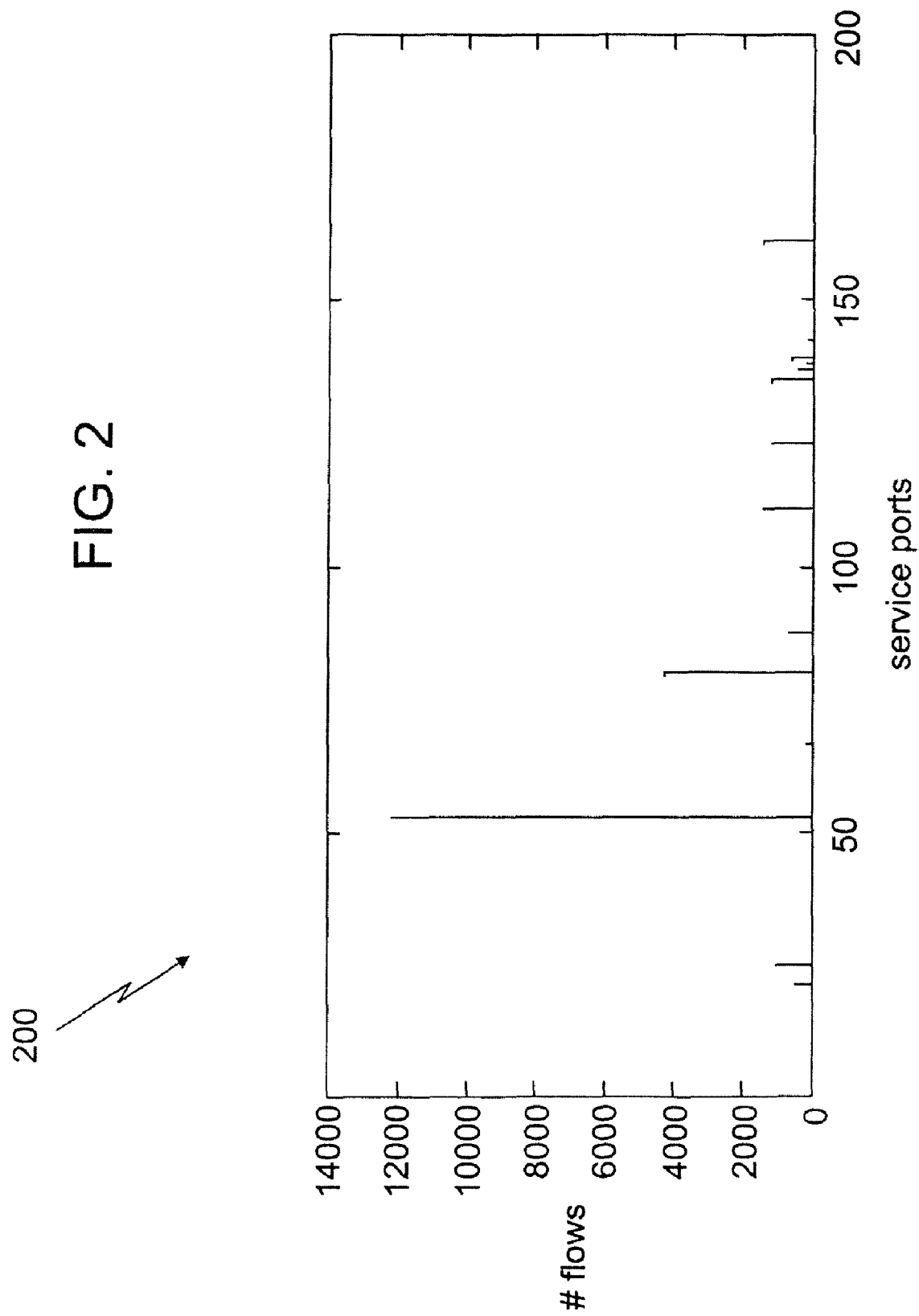
FIG. 2 depicts a flow-count histogram in accordance with exemplary embodiments.

In exemplary embodiments, flow records exported by traffic meters (e.g., routers, switches) coupled to the system 100 provide a large set of statistics of observed network flows. The statistics relate to different traffic features that include, for example, service ports, IP addresses, the number of packets and bytes per flow, TCP flags, start and end time and, the duration of a flow. Each feature includes of a set of associated components, i.e., the actual values the statistics can take. For example, port numbers 80/http and 22/ssh are components of the "service port" feature. When collecting exported flow records over a period of time, the total number of flows observed in each component can be counted and represented in a vector. The "snapshot" of network traffic is referred to as a flow-count histogram of a feature. FIG. 2 depicts a flow-count histogram 200 representing the usage of service ports 1-200 observed in a production network during a 5-min period in accordance with exemplary embodiments.

Figure 3:
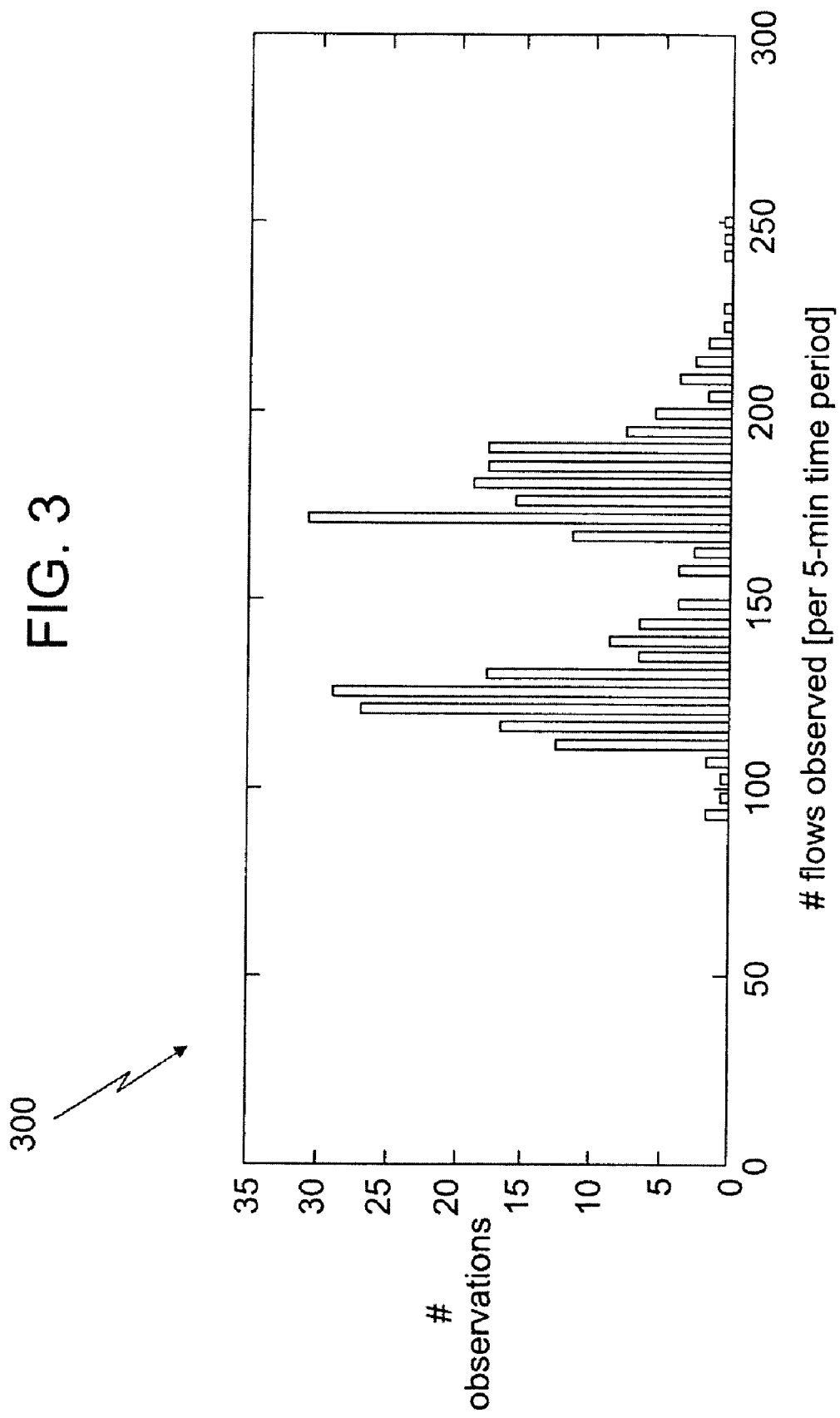
FIG. 3 illustrates a plot of a distribution of flow counts in accordance with exemplary embodiments.

In exemplary embodiments, by monitoring a network over a long period of time, a time series of flow-count histograms can be collected for a given traffic feature; each histogram is a statistic of the observed traffic over a sub-period of fixed duration. Instead of focusing on the histograms, the time series of flow counts in each component (i.e., the corresponding frequency distribution of the counts) are tracked. FIG. 3 illustrates a plot 300 of a distribution of flow counts in 5-min periods for a service port 22/ssh over one day, in accordance with exemplary embodiments. By analyzing) the flow-count distributions, the components generally exhibit multiple behavior modes depending, for example, on time of day, maintenance operations, or application and protocol states. Based on this observation, the anomaly detection systems and methods described herein extract and model the behavior modes in each component. Anomalies can affect the flow counts in one or more components of different traffic features and cause deviations from the models. For example, a worm outbreak may increase the flow counts in several service ports and IP addresses whereas a server outage leads to a decrease of flow counts of the server's IP address.

Figure 4:
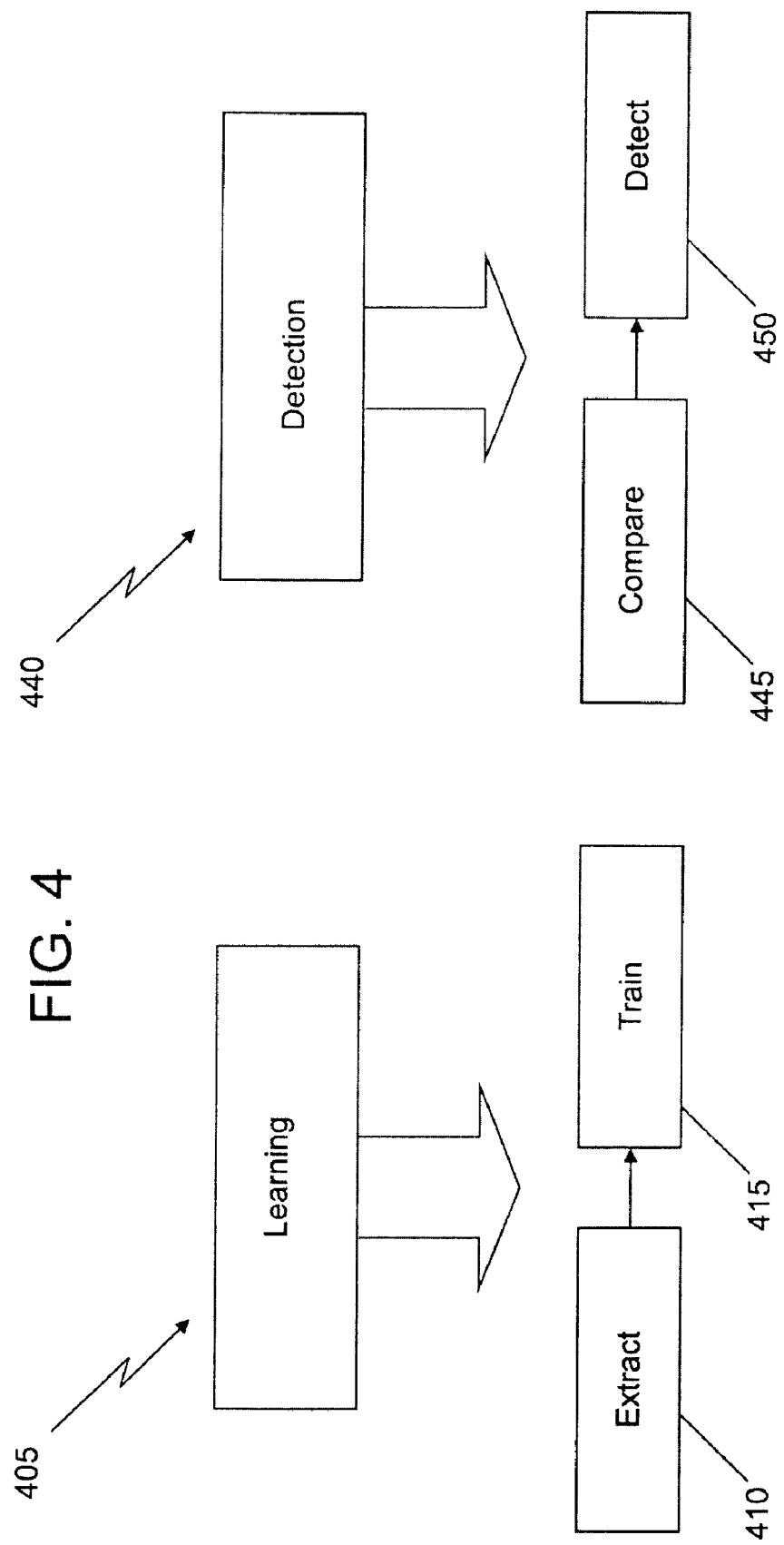
FIG. 4 illustrates a block diagram of phases for detecting flow-level network traffic anomalies in accordance with exemplary embodiments.

In exemplary embodiments, the systems and methods described herein implement a two phase technique as illustrated in FIG. 4. The two phases include a learning phase 405 and a detection phase 440. Both phases 405, 440 in turn are composed of two steps. In the learning phase 405, positive (anomaly-free) training data is analyzed and model parameters of the behavior are extracted 410 in an unsupervised fashion. Then, based on the learned models, the detection logic is trained 415. During the detection phase, observed network behavior is compared 445 to the baseline models and a detection operation 450 is performed. In exemplary embodiments, the extracting step can be considered as an intermediate phase between the learning phase 405 and the detection phase 440. In exemplary embodiments, acquiring entirely anomaly-free data in the learning phase is impractical. As such, the systems and methods take into account that the training data may contain a few anomalies. Consequently, a model extraction algorithm that is robust to the presence of a small fraction of deviating observations is contemplated. In exemplary embodiments, the training data is split into two data sets: a training and a testing set. In a first learning step, the systems and methods described herein search for behavior modes in the training set and extracts their models. Then, the learned models are tested against the testing set to derive meaningful threshold values. In exemplary embodiments, models for flow-count distributions (FIG. 2) are derived by considering them as the outcome of a finite set of random variables generating multi-modal data. The systems and methods described herein mine for these modes and retrieve representative model values from them (e.g. mean values). In exemplary embodiments, a deterministic technique mines for local maxima in flow-count densities by means of a filtering approach, inspired by a density-based clustering algorithm that is robust to noise. An adapted algorithm iteratively scans the distribution, starting from low flow counts, and forms local groups of neighbors in regions of similar density.

In exemplary embodiments, the detection technique operates on a set F of selected network features. Each feature f in F consists of a finite number of components $c_i^f$ with i=1, ..., $n^f$. The value $n^f$ represents the dimensionality of the feature space of f. For the sake of simplicity and without loss of generality, the notation is restricted to a single feature f henceforth and omits superscripts. However, it is appreciated that the restriction to a single feature f is for illustrative purposes and that many additional features are contemplated in exemplary embodiments. A vector h=($h_1$, ..., $h_n$) denotes a flow-count histogram where $h_i$ is a non-negative count of flows associated to component $c_i$. Each component $c_i$ has a baseline set $\Theta_i=\{\theta_1, ..., \theta_m\}$ that represents its normal behavior modes. A behavior mode $\theta_j$ is expressed by two model parameters: a mean value $m_j$ of the observed flow counts in the mode and a scaling factor $s_j$ reflecting their spread around the mean.

As described above, during the learning (and extraction) phase, the training data is split into two data sets: a training and a testing set. In a first learning step, the systems and methods described herein search for behavior modes in the training set and extracts their models. Then, the learned models are tested against the testing set to derive meaningful threshold values. In exemplary embodiments, models for flow-count distributions (FIG. 3) are derived by considering them as the outcome of a finite set of random variables generating multi-modal data. The systems and methods described herein mine for these modes and retrieves representative model values from them (e.g., mean values).

During the detection phase 440, flow information exported at observation points is collected and divided into disjoint time intervals of fixed, predefined length. As discussed above, the discussion is limited to a single feature f.

Figure 5:
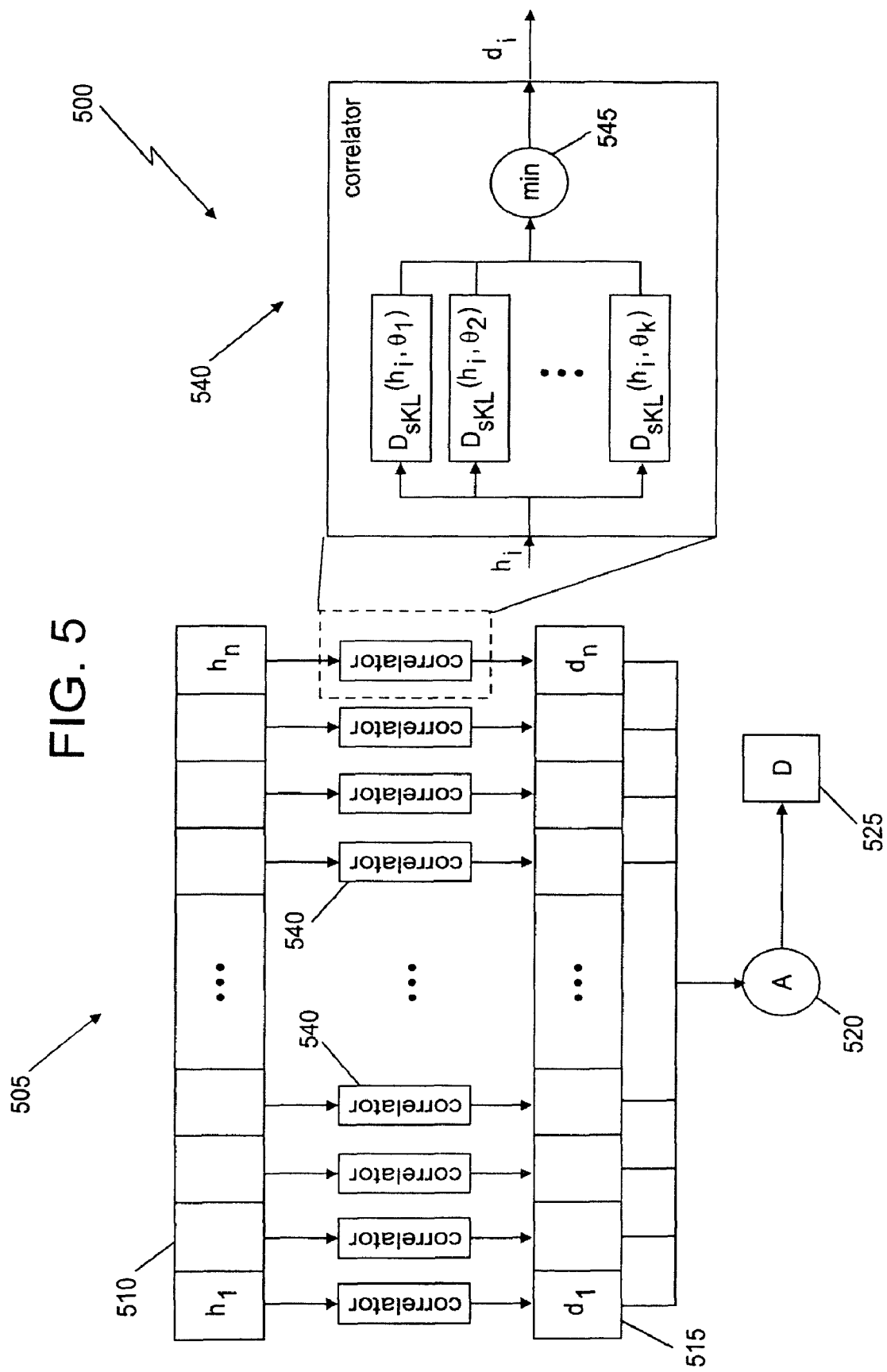
FIG. 5 illustrates a diagram of a component wise matching system in accordance with exemplary embodiments.

FIG. 5 illustrates a diagram of a component wise matching system 500. The system 500 includes computations 505 for component-wise distances and a global distance of a flow count histogram (FIG. 2) h=($h_1$, ..., $h_n$) at a time t in a given traffic feature. The computations include an observed distribution 510, a local anomaly distance 515, an aggregation component 520 and a global anomaly index 525 (component-wise). The system 500 further includes correlators 540 that select a distance $d_i$ as the distance to the closest behavior mode θ in Θ (extracted in the extraction step 410) with respect to $h_i$ in component i. The correlator 540 includes a selection criterion component 545 (feature-wise).

For each time interval t, a feature histogram h=($h_1$, ..., $h_n$) is constructed with the number of observed flows $h_i$ in each component. The processing of an observed feature histogram h begins with a matching operation performed in each component of h individually as depicted in the computations 505. In exemplary embodiments, the correlator 540 is a non-linear correlator element that receives the measured flow count hi in component i as an input and outputs the distance di to the closest known baseline model in the baseline set. In each component i of f, the distance $d_i$ is compared to a threshold value $T_i$ that has been derived in the training step 415 the learning phase 405. If $d_i$ exceeds $T_i$, then the system has found an abnormal deviation in component i.

In exemplary embodiments, the component-wise distances $d_i$ form an n-dimensional distance vector at time t of the feature, which acts as an input to a summarization function A that computes a global distance D=A($d_1$, ..., $d_n$) over all component-wise distances in the feature f. In exemplary embodiments, the global distance D is compared to the global threshold T for f. Aberrant behavior in the network feature at time t is lagged as D exceeds T.

The presence of abnormal conditions in one or more traffic feature distributions and the combination and nature thereof is used as an indicator of the type of the anomaly. Visual inspection of the predominant conditions supports the analysis of potential root causes of the anomaly.

FIG. 6 illustrates a flow chart of a method 600 for detecting flow-level network traffic anomalies on two abstraction levels in accordance with exemplary embodiments. As described above, the method 600 includes a learning phase 601 and a detection phase 602. As the system 100 is operating at block 605, current distributions of flow level traffic features can be obtained at block 610. At block 615, the distance of current distributions from the established model can be computed. At block 620, the system 100 determines f the measured distance is above the threshold. If the distance is not above the threshold at block 620, then the distance is considered OK at block 625. If the distance is above the threshold at block 620, then the distance is considered to be an anomaly at block 630. The system 100 continues to obtain current distributions at block 610.

Referring still to FIG. 6, the models and thresholds implemented at blocks 615 and 620 are now discussed. At block 635, the system is initialized. At block 640, states of the system 100 are stored at block 645 at different instants. As discussed above, positive (anomaly-free) training data is analyzed and stored. At block 645, the system 100 stores feature distributions all during the learning phase 601. In the extraction step 641, at block 651, behavior modes are extracted from the feature distributions 645. In the training) step, at block 660, the system 100 determines thresholds, which are stored at block 665 and ultimately implemented at block 620 as discussed above. At block 655 models per feature component are stored at and implemented at block 615 as discussed above.

EXAMPLE

An existing flow collection infrastructure is extended and an anomaly detection component is implemented. The flow collection infrastructure provides the measured flow-level statistics to the anomaly detection component. The latter applies the exemplary methods described herein on the measured data periodically. The component can be attached to any flow collection infrastructure providing an interface to retrieve flow count statistics.

The implementation of an anomaly detection component has three operational states: a learning state, an extraction state (referring to the learning phase 405 and 601) and a detection state (referring to the detection phase 440 and 603).

In the learning state, the system collected network traffic for later analysis and model extraction. This phase requires temporary disk space for traffic statistics (an integer per analyzed component and time period).

In the extraction state, the system analyzes the learned traffic statistics and produces traffic models and thresholds. This state outputs model representations for each analyzed component. The number of models depends on the number of "behavior modes" found in the learning data (these are typically rather low: about 1 to 10 modes per component). In general, acquiring entirely anomaly-free data in the learning phase is impractical; it is therefore assumed that the training data may contain a few anomalies. Consequently, the extraction technique should be robust to the presence of a small fraction of deviating observations. A clustering algorithm that is robust to noise to mine for the behavior modes and learn meaningful thresholds is implemented.

In the detection state, the system collects network traffic and performs the detection operations. In this state, the system triggers alerts whenever anomaly events are detected. The implementation of the detection state consists mainly of the two-layered detection technique depicted in FIG. 5.

The update of the traffic models set of a component (e.g., in case of false positives) is performed by adding/removing/modifying single models.

As such, in the first step of the detection phase, the systems and methods described herein compute the distances to the learned models and select the smallest distance in each component individually. Implicitly, this refers to an on-the-fly construction of a dynamically composed baseline histogram with the closest known behavior mode placed in each of its component. In exemplary embodiments, all learned models have the same weight in the selection process, independently of the number of observations in the learning phase.

In exemplary embodiments, the component-wise analysis measures how close the flow counts observed in each component i match the learned behavior modes in $\Theta_i$. This indicator enables the detection of anomalies that affect individual components, e.g., a host or service failure or the presence of an abnormally large number of flows with similar properties in certain features (e.g., Spam relaying, DoS attacks). However, some anomalies are likely to contribute only small deviations in many components and are therefore not detected at the component-wise detection layer. Feature-wise analysis exposes these deviations by accumulating the component-wise distances to a single global index. For example, a port scan adds a small increase in the flow counts of the ports scanned. While there is no substantial deviation from the normal behavior measured in each port, its presence is revealed by a large deviation in the global anomaly index of the ports.

Deviation vectors provide a detailed view on the measured deviations and enable interpretable analysis of suspicious activities to support operator decisions. By visually inspecting deviation vectors of features in which an alarm has been raised, the nature of the changes can be determined. Incorporation of administrator feedback and model updates in the case of a false alarm is facilitated by the individual modeling of the components. Selective updates of component models as well as continuous adaptation to changes in the environment are supported by adding model parameters of a new behavior mode to the baseline set or by retraining the modes in one or more components.

Technical effects and benefits include the ability to individually modeling of component behavior patterns, incorporate multi-modal models (i.e., taking the different behavior modes of the network traffic in account detection of anomalies of different nature), construct the best local matching distribution on-the-fly, generate a deviation vector in each feature indicating deviation of observation in each component (incident analysis, traceability, correlation of events affecting multiple features), and provide selective model updates and on-line administrator feedback in O(1).

Figure 7:
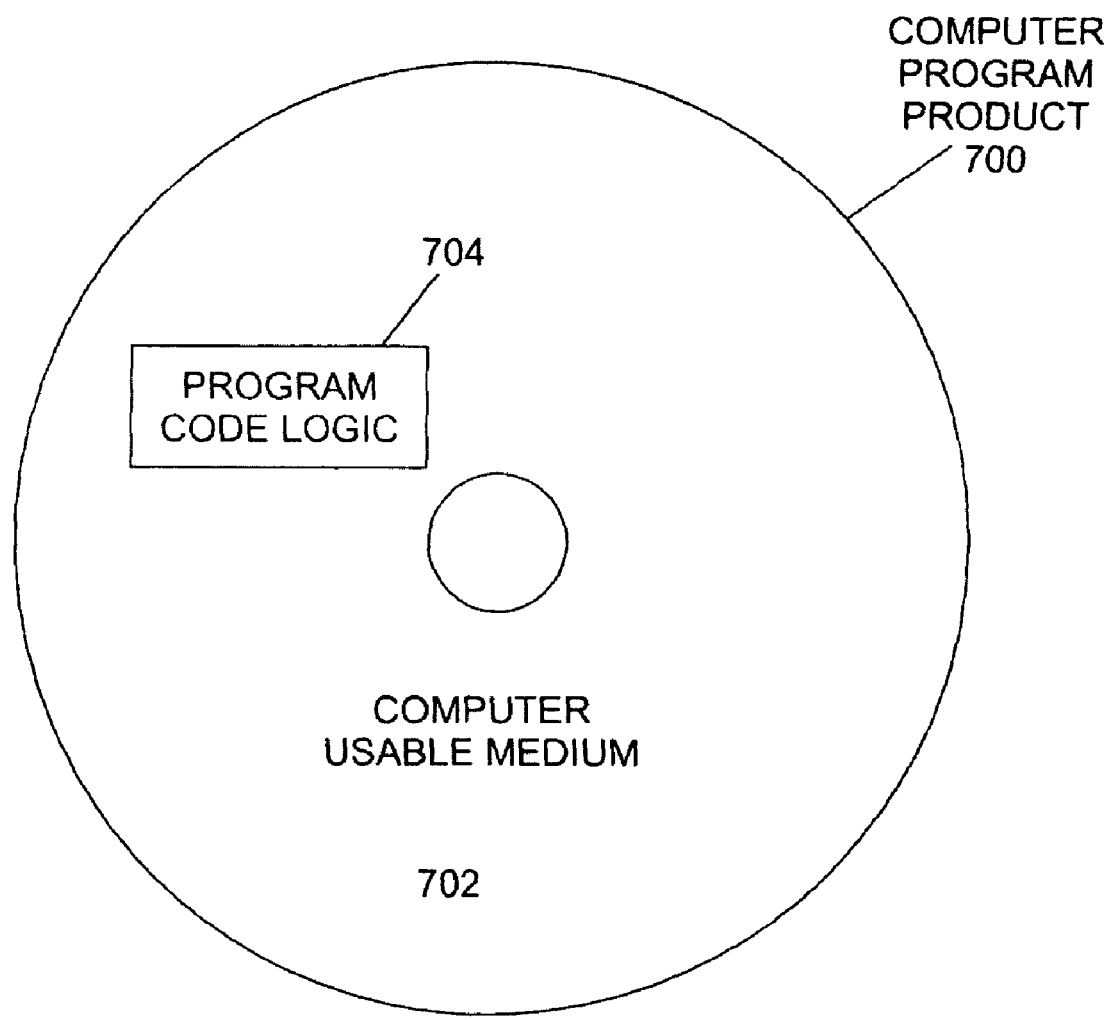
FIG. 7 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 700 as depicted in FIG. 7 on a computer usable medium 702 with computer program code logic 704 containing instructions embodied in tangible media as an article of manufacture. Exemplary articles of manufacture for computer usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. In a computer system having a processor, a method for detecting flow-level network traffic anomalies, wherein the processor performs the method comprising:
  obtaining current distributions of flow level traffic features within the computer system;
  computing a distance of the current distributions from a distributions model, wherein the distance includes a component-wise analysis layer and a feature-wise analysis layer, wherein the component-wise layer measures how close flow level traffic behavior observed in each component of the flow level traffic features matches learned behavior modes, thereby detecting changes that affect individual components, and wherein the feature-wise layer identifies abnormal behavior by accumulating the component-wise distances to a single index in each of the flow level traffic features;
  comparing the distance of the current distributions to a distance baseline from the distributions model;
  determining if the distance is above a pre-determined threshold;
  in response to the distance being above the pre-determined threshold, identifying the distance to be an anomaly; and in response to the distance being below the pre-determined threshold, identifying the distance to be within normal operation of a computer network under observation.

2. The method as claimed in claim 1 further comprising analyzing and storing positive training data of the computer system running in a mostly anomaly-free state as feature distributions of the computer system.

3. The method as claimed in claim 2 further comprising extracting individual behavior modes of the components in feature distributions.

4. The method as claimed in claim 3 further comprising developing the distributions model from the extracted behavior modes.

5. The method as claimed in claim 3 further comprising determining the pre-determined thresholds from the feature distributions and the training data.

6. The method as claimed in claim 3 further comprising storing the model for a feature component based on the extracted behavior modes.

7. The method as claimed in claim 1 wherein a presence of abnormal conditions in one or more traffic feature distributions and a combination and a nature of the traffic features distributions indicates a type of an anomaly.

8. A computer system for detecting flow-level network traffic anomalies, the system comprising:
a processor;
a first computation layer associated with the processor, the first computation layer configured to detect anomalies that affect single components of a traffic feature associated with a computer network; and
a second computation layer associated with the processor, the second computation layer configured to detect anomalies that affect a plurality of components in the traffic feature, whereby the anomalies that affect the plurality of components in the traffic feature are detectable as an aggregate effect,
wherein the first computation layer is a component-wise layer that measures how close flow level traffic behavior observed in each component of the flow level traffic features matches learned behavior modes, thereby detecting changes that affect individual components, and wherein the second computation layer is feature-wise layer identifies abnormal behavior by accumulating the component-wise distances to a single index in each of the flow level traffic features.

9. The system as claimed in claim 8 further comprising correlators coupled to the second computation layer, the correlators receiving a flow count histogram $h=(h_1, \ldots, h_n)$ at a time t in a given traffic feature.

10. The system as claimed in claim 9 wherein the second computation layer is configured to compute component-wise distances and a global distance of the flow count histogram $h=(h_1, \ldots, h_n)$ at the time t in the given traffic feature.

11. The system as claimed in claim 9 wherein the histogram represents an observed distribution of traffic flow of the computer network.

12. The system as claimed in claim 10 wherein the correlators output a distances $d_i$ for each of the flow count histogram elements $h_1, \ldots, h_n$ to a closest known baseline model in a baseline set of a feature component i.

13. The system as claimed in claim 12 wherein each distance $d_i$ is compared to a pre-determined threshold value $T_i$ and if $d_i$ exceeds $T_i$, then the system determines that there exists an abnormal deviation in a component i.

14. The system as claimed in claim 8 wherein a summarization function disposed in the second computation layer computes a global distance $D=A(d_1, \ldots, d_n)$ over all component-wise distances in a feature f.

15. The system as claimed in claim 14 wherein the second computation layer compares the global distance D to a global threshold T for f.

16. The system as claimed in claim 15 wherein the second computation layer flags aberrant behavior in the traffic feature at time t is as D exceeds T.

17. A computer program product for detecting flow-level network traffic anomalies, the computer program product comprising:
a tangible storage medium readable by a processing circuit and storing instructions for execution by the processing circuit for performing a method comprising:
obtaining current distributions of flow level traffic features within the computer system;
computing a distance of the current distributions from a distributions model, wherein the distance includes a component-wise analysis layer and a feature-wise analysis layer, wherein the component-wise layer measures how close flow level traffic behavior observed in each component of the flow level traffic features matches learned behavior modes, thereby detecting changes that affect individual components, and wherein the feature-wise layer identifies abnormal behavior by accumulating the component-wise distances to a single index in each of the flow level traffic features;
comparing the distance of the current distributions to a distance baseline from the distributions model;
determining if the distance is above a pre-determined threshold;
in response to the distance being above the pre-determined threshold, identifying the distance to be an anomaly; and
in response to the distance being below the pre-determined threshold, identifying the distance to be within normal operation of the computer system.

18. The computer program product as claimed in claim 17 wherein the method further comprises:
analyzing and storing positive training data of the computer system running in an anomaly-free state as feature distributions of the computer system; and
extracting behavior modes of the feature distributions.

19. The computer program product as claimed in claim 17 wherein the method further comprises:
determining the pre-determined thresholds from the feature distributions;
developing the distributions model from the extracted behavior modes; and
storing the model for a feature component based on the extracted behavior modes.

20. The computer program product as claimed in claim 17 wherein a presence of abnormal conditions in one or more traffic feature distributions and a combination and a nature of the traffic features distributions indicates a type of an anomaly.

* * * * *